Dec. 18, 1928.  1,696,132
W. WERMEILLE
MEASURING INSTRUMENT
Filed Sept. 12, 1927
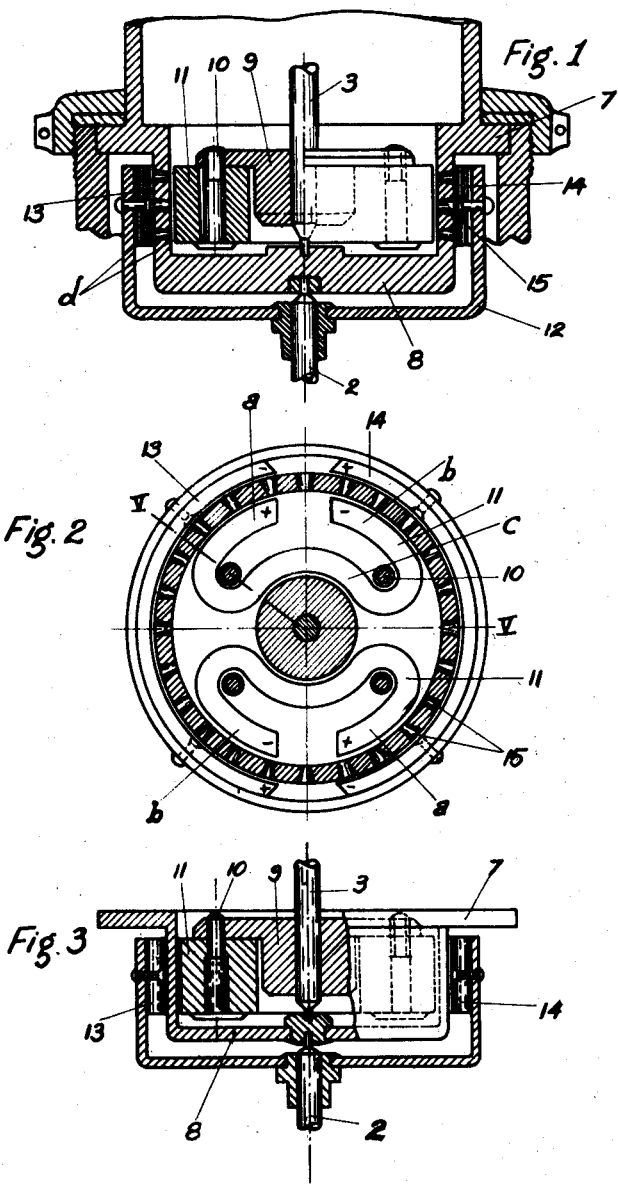
INVENTOR:
W. Wermeille
BY Marks & Clark
ATTORNEYS.

Patented Dec. 18, 1928.

1,696,132

UNITED STATES PATENT OFFICE.

WERNER WERMEILLE, OF ST.-AUBIN, SWITZERLAND.

MEASURING INSTRUMENT.

Application filed September 12, 1927, Serial No. 219,049, and in Switzerland November 10, 1926.

The present invention relates to measuring instruments and particularly to meters for water or other liquids of the type comprising a driving mechanism operated by the flow of the liquid and separated from the indicating mechanism by a liquid tight diaphragm.

The invention has for its object to provide a water-meter of the above mentioned type in which the motion of the driving mechanism is transmitted to the indicating mechanism by means of a magnetic coupling consisting of at least two permanent magnets located on either side of the diaphragm, one of same being controlled by the driving mechanism meanwhile the other is operating the indicating mechanism, the magnets having a special shape so as to require little space.

The accompanying drawing partly illustrates by way of example two practical embodiments of this invention.

Figs. 1 and 2 refer to the first form of construction. Fig. 1 is a vertical section thereof taken on line V—V of Fig. 2, while Fig. 2 is a plan view.

Fig. 3 is a vertical section of the second form of construction.

In the first embodiment according to Figs. 1 and 2 the meter casing is separated in two chambers by the cup-shaped diaphragm 7 within the bottom of which is pivoted the shaft 3 which operates the recording device of the indicating mechanism. To the shaft 3 is connected the collar 9 on which are screwed the two permanent magnets 11. These magnets are cylindrically shaped, their cross-section comprises two annular segments of like radius $a$ and $b$ connected by one annular segment of smaller radius $c$. On the shaft 2, which is propelled by a paddle-wheel not shown on the drawing, is fixed a second cup 12 concentric with cup 8, on which are fastened the two magnets 13 and 14 of semi-annular cross-section. Owing to this disposition an excellent magnetic drive is obtained within a minimum of space. 15 are tapered steel plugs driven into the diaphragm in order that the conductivity of the magnetic field is not restrained since the diaphragm is preferably made of bronze.

The form of construction shown in Fig. 3 is similar to the preceding one, but is used to measure liquids of low pressure. Consequently the diaphragm is made thinner and does not contain steel plugs.

I claim:

In a measuring instrument for liquids comprising a driving mechanism transmitting its motion by means of a magnetic coupling to the indicating mechanism, the combination of two cylindrical magnets, of which the cross-section comprises two annular segments of like radius connected together by an annular segment of smaller radius, said cylindrical magnets adapted to cooperate with two magnets of semi-annular cross-section separated from the said cylindrical magnets by a liquid tight diaphragm.

In testimony whereof I affix my signature.

WERNER WERMEILLE.